United States Patent [19]

Newton

[11] 4,172,441
[45] Oct. 30, 1979

[54] SOLAR HEAT COLLECTOR PANEL AND METHOD OF FORMING SAME

[75] Inventor: T. Lawrence Newton, Atherton, Calif.

[73] Assignee: Sunburst Solar Energy, Menlo Park, Calif.

[21] Appl. No.: 836,402

[22] Filed: Sep. 26, 1977

[51] Int. Cl.² .................... F24J 3/02; B31C 13/00
[52] U.S. Cl. ................... 126/442; 165/178; 156/169
[58] Field of Search ............... 126/270, 271; 156/169, 156/269; 165/162, 163, 172, 170, 178; 122/250; 29/157.3 C, 157.3 AH, 458, 469.5

[56] References Cited

U.S. PATENT DOCUMENTS

| 1,747,826 | 2/1930 | Gould | 126/271 |
|---|---|---|---|
| 2,277,921 | 3/1942 | McCullough et al. | 165/172 X |
| 2,282,759 | 5/1942 | Gavitt | 156/169 X |
| 2,449,952 | 9/1948 | Pridham | 156/169 X |
| 2,578,059 | 12/1951 | Graham | 165/162 X |
| 3,006,612 | 10/1961 | Herbert | 165/163 X |
| 3,300,354 | 1/1967 | Duft | 156/169 |
| 3,802,987 | 4/1974 | Noll | 156/296 |
| 3,952,725 | 4/1976 | Edmondson | 126/271 |
| 4,014,314 | 3/1977 | Newton | 165/162 X |
| 4,060,071 | 11/1977 | Chayet | 126/271 |

*Primary Examiner*—Samuel Scott
*Assistant Examiner*—Larry Jones
*Attorney, Agent, or Firm*—Julian Caplan

[57] ABSTRACT

A solar heat collector panel comprising a flat spiral coil of pipe (preferably plastic) having an inlet at the inside and outlet at the outside, the inlet conduit extending out behind the coil. A plurality of approximately radial ribs is attached behind the coil to support the coil spaced from the surface on which it is installed to create a dead air space, prevent dry rot of the supporting surface, hold the coil level and stiffen the panel. A sheet of plastic material is caused to adhere to the back of the coil by adhesive and vacuum molding. The method of fabricating the panel is described in detail. This invention is an improvement on U.S. Pat. No. 4,014,314.

9 Claims, 9 Drawing Figures

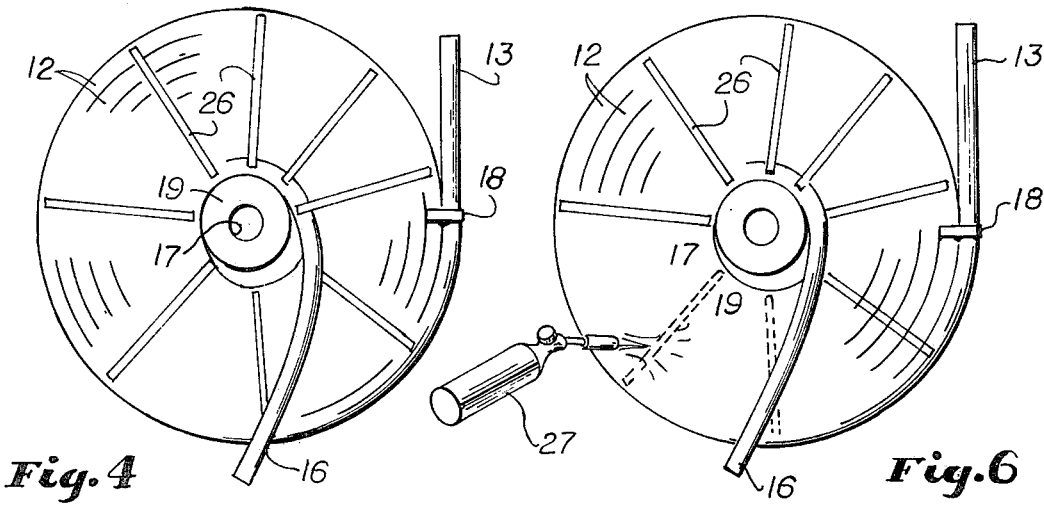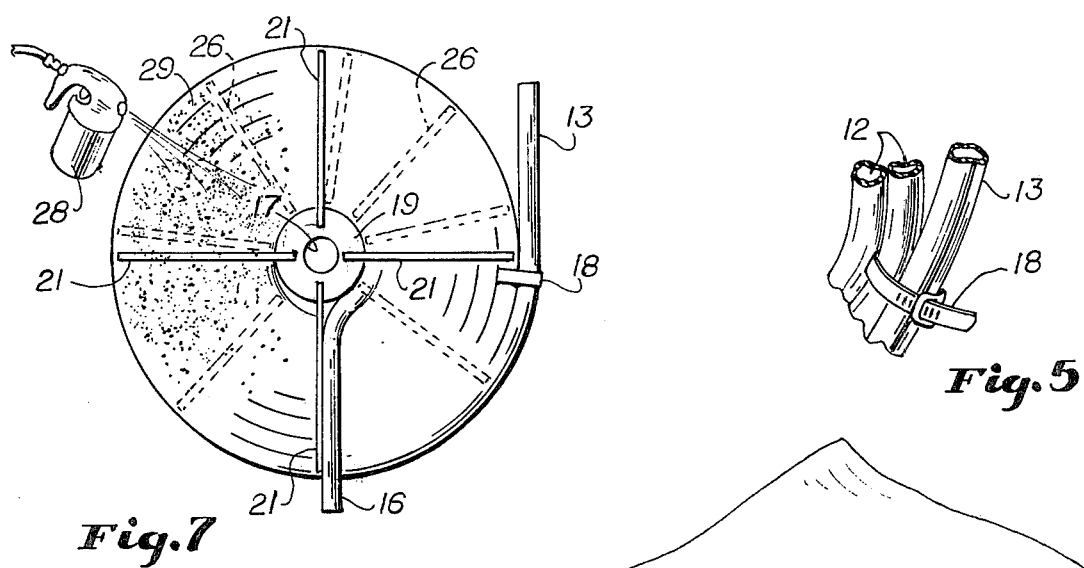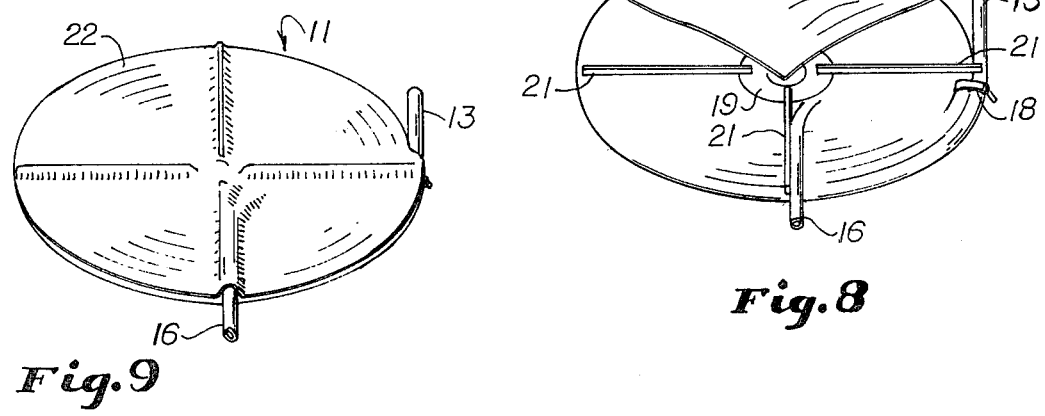

SOLAR HEAT COLLECTOR PANEL AND METHOD OF FORMING SAME

This invention relates to a new and improved solar heat collector panel and to a method of forming same.

The present invention incorporates many of the advantages of U.S. Pat. No. 4,014,314, and relates to panels adapted to heating water of other fluid substances pumped through a single sinuous conduit.

In keeping with the prior patent, the present invention is less sensitive to variations in the angle of incidence through the diurnal cycle as compared with prior panels and also does not require frequent realignment with the sunlight vestor. Further the overall structure is simple and less costly than conventional collectors. Further, the collecting surface is composed of a continuous length of a fluid conveying tubing coiled in a substantially flat spiral.

The present invention has certain advantages over those of the prior patent, particularly its adaptability to large scale production and to economy in the labor and materials required to fabricate the panel.

Additionally, the present invention provides a panel which is relatively stiff and does not tend to uncoil during shipment and while the panel is being installed on a roof or other supporting structure.

By reason of the structure of the panel, its installation is simplified. Further, the panel is of such structure that a dead air space between the panel and the supporting structure is created which is easily drained and inhibits dry rot of the supporting structure. Additionally, the panel remains level even though subjected to high temperatures at the site of installation.

Further advantages reside in the method of fabrication of the panel as hereinafter appears.

Other objects of the present invention will become apparent upon reading the following specification and referring to the accompanying drawings in which similar characters of reference represent corresponding parts in each of the several views.

In the drawings:

FIGS. 4, 6, 7, 8 and 9 are somewhat schematic plan views showing steps in the method of fabrication of the coil of FIGS. 1-3.

FIG. 5 is a fragmentary perspective view showing use of a clamp to hold the coil in position preliminary to subsequent fabrication.

Panel 11 has a continuous flow channel of a single length of elongated, fluid carrying tubing wound into a flat spiral. The tubing may be of a plastic or metal construction and has a range of from ½ to 1 inch in internal diameter. Typically, a panel 11 is several feet in diameter, presenting a collecting surface in a flat plane of 10 square feet or more. Because the surface of the panel 11 is composed of the upper circumference of substantially tubular flow channels, the effective collection surface is larger than the projected area of the panel. Further, because of the circular, shallow spiral of the tubing, the effective collection surface is independent of the angle of incident solar radiation once the plane of the collector has been aligned with the local mean solar radiation vector, the value of which may be determined by reference to tables.

A preferred material of construction of the tubing 12 of panel 11 is polyethylene having a forming temperature in the range of 180° F. to 250° F. Other suitable plastic material are certain acrylics, ABS, butylrates, polycarbonates, polystyrene, polyvinyl and polypropylene. Alloys of the foregoing plastics are also suitable, particularly an alloy of ABC and polycarbonate, an alloy of acrylics and PVC, an alloy of ABS and PVC and the like. Preferably, the plastics have pigments incorporated therein to make them dark, preferably black and semi-opaque for optimum collection efficiency for radiant solar heat, and also to reduce aging from exposure to the ultraviolet solar spectrum. Instead of plastic, the tubing 12 may be of metal, a preferred metal being black anodized aluminum.

Figure 2:
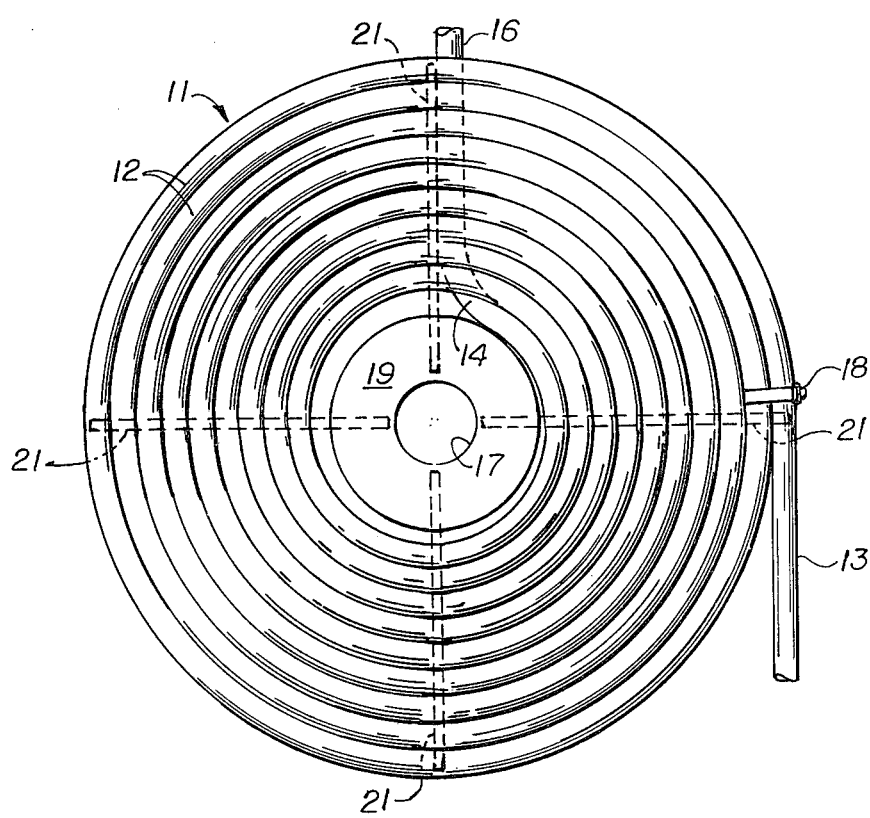
FIG. 2 is a top plan view thereof.

As best shown in FIG. 2, the panel 11 consists of a flat spiral coil of continuous tubing 12, the adjacent coils being tangent to each other. The inlet 14 of the tubing is adjacent the center 17 of the panel 11, there being an inlet conduit 16 extending approximately radially from the exterior to the inlet 14 behind the panel. The outlet 13 is an approximately tangential continuation of the tubing 12. Of course, suitable connections are attached to conduits 13 and 16 such as those explained in U.S. Pat. No. 4,014,314. To facilitate coiling and to prevent crushing during vacuum molding a disk 19, preferably annular, is installed in the center of the coil. Disk 19 may be of composition board (e.g. Masonite), about ⅜ inches thick, having about a 21 inch O.D. and 9 inch I.D.

Another structure of the panel 11 is best described in connection with the preferred method of fabrication, which is hereinafter set forth.

The first step in the method of fabricating the panel 11 is to form the spiral by bending the tubing into flat spiral shape around disk 19, the inlet conduit 16 being extended approximately radially outwardly of the coil at the back as shown in FIG. 4 which is a back plan view. To hold the coil in shape, either permanently or temporarily, a clamp 18 is attached to the two outermost coils of the spiral. Various clamps 18 may be used; but as shown in FIG. 5, an ordinary "cable clamp" used in forming a harness of electrical cables may be employed. As shown in FIG. 4, with the eventual back of the coil uppermost, a plurality of angularly spaced apart radial strips of tape 26 are applied over the tubing coils 12. The tape 26 is approximately 1" in width and functions to adhere to the tubing 12; and subsequently, to adhere to the outer sheet as hereinafter explained.

Directing attention now to FIG. 6, a flame, such as that of a blow torch, is applied to the exterior of the tubing 12 to make it compatible with the adhesive which is applied in the next step.

FIG. 7 illustrates the next step where by means of a spray apparatus, such as spray gun 28, adhesive 29 is sprayed on to the back of the coil. Various types of adhesives may be used, the general catagories being elastomeric (rubber, natural or synthetic), thermoplastic resin, thermosetting resin and others. The more important elastomeric adhesives are nitrile rubber, neoprene, butyl and styrene-butadiene rubber. One preferred form is Product Specification 4683 produced by the Adhesive Coatings and Sealers Division of 3M Company for use in adhering polyethylene tubing to polystyrene sheet. A plurality of angularly spaced apart substantially radial ribs 21 are applied to the coil immediately after the adhesive 29 is sprayed thereon. These ribs 21 are preferably rigid, a suitable material being ¾ inch by 1 inch redwood. Preferably, inlet conduit 16 extends alongside one rib 21 to protect conduit 16 from being crushed. Thus, when the panel is fully fabricated and placed in its proper position of installation with the conduit 16 and ribs 21 down, the panel is supported level and further is supported spaced from a supporting surface so that rain water drains from the space between the panel and the supporting surface and the tendency for dry rot to occur is eliminated. Further, a dead air space is created under the panel to insulate the tubing 12 from the supporting surface. The presence of the ribs 21 also stiffens the final product.

FIG. 8 shows the application of a bonding sheet 22 which forms a backing for the panel. One preferred sheet 22 is polystyrene, preferably high impact having high thermal conductivity and resistance to deterioration when subjected to sunlight. Further, it has low water absorption and its flammability characteristics are good.

As shown in FIG. 9, the final step fabrication is to vacuum mold the sheeting 22 to the coil to which adhesive has been sprayed as in FIG. 7. This forms a well-bonded unitary structure. The sheeting 22 is trimmed to proper shape after bonding.

Figure 1:
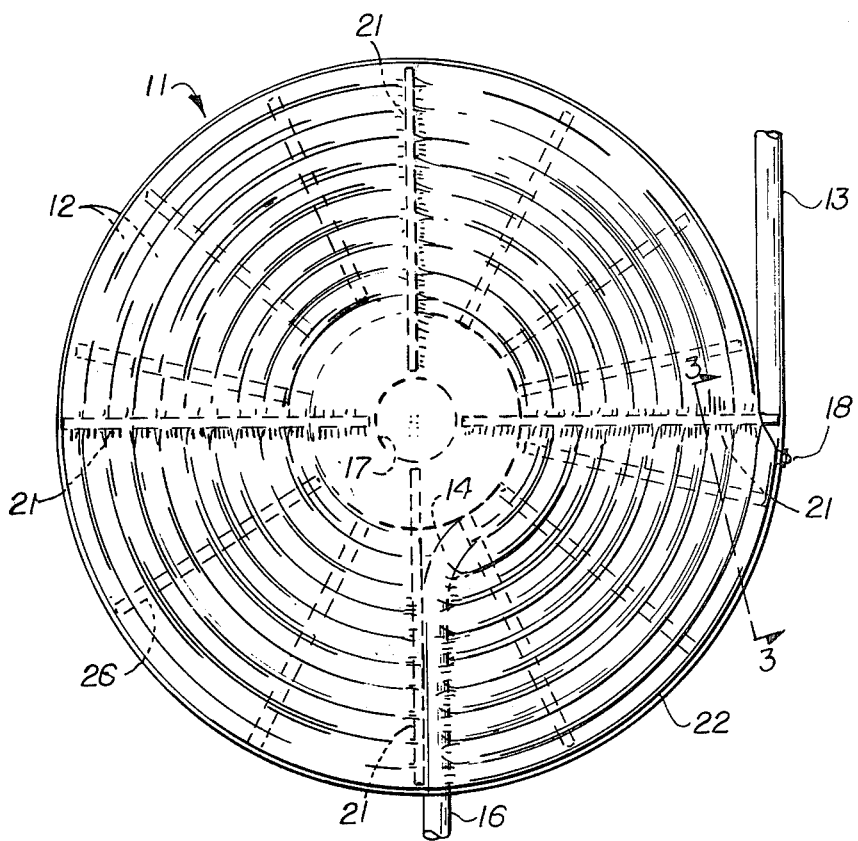
FIG. 1 is a bottom plan view in accordance with the present invention.
Figure 3:
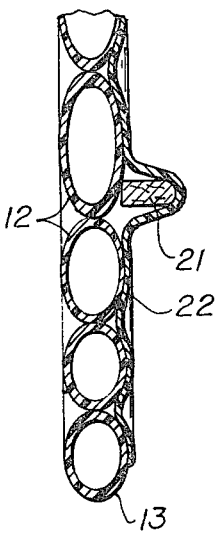
FIG. 3 is a fragmentary enlarged sectional view taken substantially along the lines 3—3 of FIG. 1.

The foregoing panel 11 is shown in FIGS. 1-3.

What is claimed is:

1. A solar heat collector panel comprising a flat spiral coil of pipe having an inner end adjacent the center of the coil and an outer end at the periphery of said coil, a sheet of flexible material and means bonding said sheet to one face of said coil,
   a conduit of pipe leading from said inner end substantially radially beyond the periphery of said coil, said conduit being positioned between said sheet and said one face of said coil, said means bonding said conduit to said sheet, and
   a plurality of ribs extending substantially radially outward between said sheet and said one face of said coil, said bonding means bonding said ribs to said sheet,
   whereby said sheet coacts with said bonding means, plurality of ribs, and said face of said coil to serve as the only means stiffening said coil against movement transverse to said coil fore and securing said coil against unwinding.

2. A panel according to claim 1 in which said conduit is positioned adjacent one of said ribs.

3. A panel according to claim 1 which further comprises a disk in the center of said coil.

4. A panel according to claim 1 in which said ribs have a thickness about the same as the diameter of said conduit.

5. A method of forming a solar heat collector panel from flexible pipe comprising coiling said pipe into a flat spiral coil having an inner end adjacent the center of the coil and an outer end at the periphery of said coil, applying adhesive to one face of said coil, and bonding to said one face a sheet of plastic material,
   said step of coiling further comprising providing a disk bending a length of said pipe from said inner end substantially radially out to the periphery of said coil around said disk and said bonding step further comprising bonding said length of said pipe to said sheet.

6. A method according to claim 5 which further comprises placing a plurality of ribs radially on said one face of said coil prior to completion of said step of applying adhesive.

7. A method according to claim 6 in which said length of said pipe is positioned adjacent one of said ribs.

8. A method according to claim 5 in which said step of bonding comprises vacuum molding to cause said sheet to adhere to and assume the configuration of said coil 9. A method according to claim 5 which further comprises the step of applying high heat to said one face of said coil prior to said step of applying adhesive.

* * * * *